Patented Dec. 12, 1939

2,182,792

UNITED STATES PATENT OFFICE 2,182,792

CARBOCYCLIC HYDROXYL ALCOHOL ESTERS OF N - ALKYL - PIPERIDINE-CARBOXYLIC ACID

Otto Dalmer and Claus Diehl, Darmstadt, Germany, assignors to Merck & Co. Inc., Rahway, N. J., a corporation of New Jersey No Drawing. Original application September 18, 1936, Serial No. 101,429. Divided and this application September 18, 1936, Serial No. 101,430. In Germany December 8, 1932

6 Claims. (Cl. 260—294)

This invention relates to derivatives of N-alkyl-piperidine-carboxylic acids, and to processes for their production.

Hitherto, simple alkyl esters of heterocyclic carboxylic acids have been known. For example, the methyl ester of nicotinic acid or the N-methyl-piperidine-3-carboxylic acid have attained a certain degree of importance as therapeutic agents in the form of their quarternary salts. Their physiological importance lies chiefly in the effect which they exert on the parasympathetic nervous system. Their action in this respect is typical of the naturally-occurring arecoline, which has a similar chemical structure.

We have now found that, in general, the esters, obtained by reacting upon these N-alkyl-piperidine-carboxylic acids with certain carbocyclic hydroxyl compounds, inhibit the development of staphlococci, coli, and gonococci, and, at the same time, are non-irritating to delicate mucous membranes, which renders them valuable for varied therapeutic uses. The salts of these esters possess the interesting and practically useful property of being water-soluble, and even when used in suspension or emulsion with a water-immiscible compound, the effective substance is almost instantaneously liberated when mixed with aqueous media, and exhibits its effect at the desired situs.

The N-methyl-piperidine-carboxylic acid thymol ester salts possess these valuable properties to a marked degree, and, among these, the N-methyl-piperidine-3-carboxylic acid thymol ester is more especially effective.

The carbocyclic hydroxyl compounds used in the esterification process may be aromatic or hydroaromatic, and include, for example, such compounds as thymol, cresol, carvacrol, chlorthymol, guaiacol, eugenol, salicylic acid ester, menthol, decahydro-2-naphtol and 4-oxydiphenyl ether.

Of the mentioned group of carbocyclic hydroxyl compounds, comprising phenols and hydro-aromatic alcohols, particularly good results are obtained with those alcohols which are slightly soluble in water; through conversion according to the present process they become more readily water soluble.

According to our invention, these new compounds may be prepared by direct esterification of N-alkyl-piperidine-carboxylic acids with the desired carbocyclic hydroxyl compound. Also, esters of pyridine-carboxylic acids may be reduced to their corresponding hexahydro-ester bases, and these then converted into the corresponding N-alkyl-piperidine-carboxylic-acid esters by alkylation. It is also possible to reduce N-alkyl-ammonium salts of pyridine-carboxylic acid esters with hydrogen. In this latter case, the salt may be formed either before or after esterification of the pyridine-carboxylic acid.

The following examples are merely illustrative of preferred methods of carrying out our invention. It will be understood that various modifications may be made therein without departing from the spirit and scope of the invention disclosed, and we are not to be restricted thereto except as necessitated by the prior art and the appended claims.

Examples

I. About 200 gms. of N-methyl-piperidine-3-carboxylic acid are boiled, with refluxing, for two hours, with 400 gms. of thionyl chloride. The excess chlorination agent is distilled off and the N-methyl-piperidine-3-carboxylic acid chloride hydrochloride, isolated after stirring with petroleum ether, is thoroughly mixed with 180 gms. of thymol, and heated to 150° on an oil bath, under stirring, for 1¼ hours. The syrupy reaction product is dissolved in water, washed several times with ether, and extracted by adding soda to the N-methyl-piperidine-3-carboxylic-acid-thymol ester. It forms a slightly colored, thick, odorless oil boiling at about 177–178° C., at 5 mm. pressure. Its hydrobromide is readily soluble in water with almost neutral reaction, and melts at about 168° C.

II. One mol of pyridine-3-carboxylic acid thymol ester (prepared, for example, from the hydrochloride of pyridine-3-carboxylic acid chloride and thymol, and having M. P. of 48° C.) is boiled for two hours, under refluxing, with one mol of dimethylsulfate in benzolic solution. After distilling off the solvent, the residue crystallizes as N-methyl-pyridine-3-carboxylic acid thymol ester methosulfate, which is clearly soluble in water, and has a melting point of about 127° C.

When the aqueous solution is shaken with platinized charcoal and hydrogen, $3H_2$ are quantitatively taken up, with the formation of the methyl-sulfuric-acid salt of N-methyl-piperidine-3-carboxylic acid thymol ester. The ester base, therefore, has B. P. 177–178° C. at 5 mm. pressure and is identical with the base described in Example I above.

III. The methyl bromide of pyridine-3-carboxylic-acid-thymol ester, melting at about 207° C., is shaken, in aqueous solution, with hydrogen in the presence of platinized charcoal or platinum oxide, until the calculated quantity is taken up. After distilling off the water, a viscous product remains which, when reprecipitated from methanol-ether, furnishes the hydrobromide of N-methyl-piperidine-3-carboxylic acid thymol ester, having a melting point of about 168° C., as described in Example I above.

IV. Twelve parts of the hydrochloride of N-methyl-piperidine-3-carboxylic acid are boiled for two hours, under refluxing, with an excess of thionyl chloride. The unused chlorination agent is distilled off and the residue, isolated after stirring with petroleum ether, is thoroughly mixed with 10 parts of chloro-metacresol. At room temperature, conversion sets in with formation of hydrogen chloride, and is completed by heating for half an hour on a steambath. The cooled, red, melted substance is treated with ether until the extracting product can be filtered off by suction. After its aqueous solution has been thoroughly washed with ether, soda solution will set free the chloro-metacresol ester of N-methyl-piperidine-3-carboxylic acid, which is purified by distillation in vacuo; it has a boiling point of about 174–176° C., at 5 mm. Its hydrochloride has a melting point of about 120° C.

V. The hydrochloride of N-methyl-piperidine-3-carboxylic acid chloride is heated with eugenol in an oil bath, for 1–2 hours. By finishing the process in accordance with the procedure described in Example IV above, the eugenol ester of N-methyl-piperidine-3-carboxylic acid is obtained. This is isolated by stirring with petroleum ether. Its boiling point at 4 mm. mercury pressure is about 174–175° C.

VI. About 40 parts of the hydrochloride of N-methyl-piperidine-3-carboxylic acid chloride are heated for ¾ hour in an oil bath, to 170–175° C., with 100 parts of salicylic acid methyl ester, whereby hydrogen chloride is split off. The excess salicylic acid ester is removed from the melting product in diluted hydrochloric acid, by treatment with ether. The N-methyl-piperidine-3-carboxylic acid-2-carbomethoxy-phenyl ester is separated by carbonate; the hydrochloride is obtained from a mixture of acetone and ether, in the form of oblong leaves having a melting point of about 104–105° C. and being neutrally soluble in water. This is in contrast to the acid reaction of hydrohalides of N-methyl-piperidine-3-carboxylic acid-2-carbophenoxy-phenyl ester obtained analogously from salol.

VII. About 40 parts of the hydrochloride of N-methyl-piperidine-3-carboxylic acid chloride are thoroughly mixed with 30 parts of menthol and the mixture heated on a steam bath until, after temporary liquefaction, complete solidification is effected. The reaction product is cooled, dissolved in water, extracted several times with ether and, by adding carbonate, the menthol ester of N-methyl-piperidine-3-carboxylic acid is obtained, having a boiling point of about 165–166° C. at 6 mm. pressure, and being in the form of a slightly yellow oil.

By introducing hydrogen bromide to a solution of the ester in absolute alcohol, until its color turns reddish, and carefully adding first ether and then petroleum ether, the hydrobromide of the ester crystallizes in an ice mixture, in the form of fine needles melting at about 185° C.

VIII. The menthol ester of pyridine-3-carboxylic acid (prepared according to the process described in German Patent No. 440,935) is carefully heated with an equal molecular quantity of dimethyl sulfate until reaction sets in, which may be moderated by occasional cooling. After a short time, the product solidifies quantitatively to the crystallized N-methyl-pyridine-3-carboxylic acid menthol ester-methosulfate, having a melting point of about 110–112° C., from which the N-methyl-pyridine-3-carboxylic acid-menthol ester methyl-sulfuric acid salt may be obtained by hydration. The hydrobromide similar to that described in Example VII may be obtained by treating the free ester base with hydrogen bromide.

IX. The borneol ester of pyridine-2-carboxylic acid, (prepared according to the method of German Patent No. 440,935) is mixed with the calculated quantity of dimethyl sulfate to produce N-methyl-pyridine-2-carboxylic acid-borneol-ester methosulfate which may easily be reduced to the N-methyl-piperidine-2-carboxylic acid borneol ester salt. The free ester base distills at 5 mm. pressure between 161–162° C., as a light oil. Its hydrochloride is obtained as a crystalline solid.

X. The hydrochloride of N-methyl-piperidine-3-carboxylic acid chloride is heated for a short time to 120–130° C. with y-phenyl-propyl resorcin and, by following the steps described in the preceding examples, N-methyl-piperidine-3-carboxylic acid phenyl ester is obtained in the form of a thick oil; its hydrochloride is readily soluble in water, and melts at about 60–65° C.

By treating the same acid chloride with 4-oxy-diphenyl ether at 135–140° C., N-methyl-piperidine-3-carboxylic acid-4-phenoxy-phenyl ester is obtained; its hydrochloride, recrystallized from an acetone-petroleum ether mixture, melts at 167° C.

Treatment of the same acid chloride with decahydro-2-naphthol (bath temperature 140–150° C.) produces N-methyl-piperidine-3-carboxylic acid decahydro-2-naphthyl ester having a boiling point of about 183–185° C. at 5 mm. pressure; its hydrochloride melts at about 120° C.

With tetrahydro-2-naphthol, the acid chloride produces N-methyl-piperidine-3-carboxylic acid tetrahydro-2-naphthyl ester distilling between 199 and 200° C. at 5 mm. pressure; from it, a crystalline hydrochloride is obtained (from acetone-ether) having a melting point of about 197° C.

XI. The thymol ester of pyridine-3-carboxylic acid is reduced by shaking its alcoholic solution with platinum oxide at room temperature, whereupon it will take up 3 mols. of hydrogen. After separating the catalyst and solvent, an oil remains which, when stirred with petroleum ether, is transformed into a solid. By reprecipitation from acetone-petroleum ether, piperidine-3-carboxylic acid thymol ester is obtained in glossy chips melting at about 100–101° C., its methyl bromide is identical with the hydrogen bromide of N-methyl-piperidine-3-carboxylic acid thymol ester of Examples I and II.

XII. Pyridine-2-carboxylic acid is boiled with triple its weight of thionyl chloride, until the hydrochloride is completely formed. The excessive chlorinating agent is distilled off and the remaining pyridine-2-carboxylic acid chloride-hydrochloride is separated, if necessary, after rubbing with alcohol.

The salt is mixed with the calculated quantity of thymol powder and heated to 120–130° C. (bath temperature) on an oil bath for one hour, whereupon the ester is formed. The melted product is cooled and comminuted, and freed of impurities by treatment with ether. It is then dissolved in water and the pyridine-2-carboxylic acid thymol ester is extracted from it in the usual manner. The ester has a boiling point of about 190–192° C. at 7 mm.

Molecular quantities of the ester and diethyl sulfate are heated for about one hour on a steam bath to fully radiant crystalline solidification. By rubbing with petroleum ether and filtering off by suction N-ethyl-pyridine-2-carboxylic acid thymol-ester ethylsulfate occurs in the form of a white powder melting at about 130° C. and being readily soluble in water.

By reduction of the pyridine compound in a manner analogous to the process described in Example II, N-ethyl-piperidine-2-carboxylic acid thymol ester is obtained; it occurs in the form of a light-yellow oil boiling at about 186–187° C. at 10 mm. pressure; its hydrochloride crystallizes from acetone-ether, melts at about 164° C., and is readily soluble in water.

XIII. Pyridine-4-carboxylic acid is chlorinated in the same manner as pyridine-2-carboxylic acid in Example XII above, and the hydrochloride is reacted with thymol. This reaction takes place at the temperature of the boiling water and, after formation of a dark red, melting substance, results, in about half an hour, in a solid, light-yellow product. By finishing the process as described in Example XII pyridine-4-carboxylic acid thymol ester is obtained in the form of an oil the color of water, which boils at 178–179° C. at 6 mm.

While heating the ether solution of the ester with a molecular quantity of dimethyl sulfate, the reaction product begins to separate in shiny crystals. The conversion is finished quantitatively after evaporating the ether by brief heating. The N-methyl-pyridine-4-carboxylic acid thymol ester methosulfate melts at about 166° C.

As described in preceding examples illustrating the process with isomeric compounds, the reduction will here also lead to N-methyl-piperidine-4-carboxylic acid thymol ester, which occurs as a slightly colored oil; its hydrochloride occurs in the form of short, colorless prisms melting at about 198° C. and being neutrally soluble in water.

Application Serial No. 101,429, filed September 18, 1936, which claims a different modification, contains the same disclosure as this application.

We claim as our invention:

1. Esters of N-alkyl-piperidine-carboxylic acids with a compound selected from the group consisting of mono- and di-alkyl, alkoxy, and carbalkoxy derivatives of a hexacarbocyclic hydroxyl compound.

2. Esters of N-methyl-piperidine carboxylic acid with a compound selected from the group consisting of mono- and di-alkyl, alkoxy, and carbalkoxy derivatives of a hexa-carbocyclic hydroxyl compound.

3. Esters of N-methyl-piperidine-3-carboxylic acid with a compound selected from the group consisting of mono- and di-alkyl, alkoxy, and carbalkoxy derivatives of a hexa-carbocyclic hydroxyl compound.

4. The thymol ester of N-methyl piperidine-3-carboxylic acid.

5. The chlor-metacresol ester of N-methyl-piperidine-3-carboxylic acid boiling at about 174–176° C. at 5 mm.

6. The eugenol ester of N-methyl-piperidine-3-carboxylic acid boiling at about 174–175° C. at 4 mm. pressure.

OTTO DALMER.
CLAUS DIEHL.